United States Patent [19]

Croswell et al.

[11] 4,420,670

[45] Dec. 13, 1983

[54] CONTROL FOR DIELECTRIC HEATING IN BLOW MOLDING MACHINE

[75] Inventors: Fred J. Croswell, Felocity; Charles P. Shinkle, Bethel, both of Ohio

[73] Assignee: Cincinnati Milacron Industries, Inc., Cincinnati, Ohio

[21] Appl. No.: 355,222

[22] Filed: Mar. 5, 1982

[51] Int. Cl.³ .......................... H05B 6/60; H05B 6/50
[52] U.S. Cl. ............................ 219/10.81; 219/10.77; 219/10.71; 219/518; 425/174.8 E
[58] Field of Search ............... 219/10.81, 10.77, 10.75, 219/10.69, 10.71, 10.67, 10.57, 10.43, 485, 492, 518; 264/24, 25, 26, 27, DIG. 46; 425/174.8 R, 174.4, 174.8 E, DIG. 13, 526

[56] References Cited

U.S. PATENT DOCUMENTS

| | | | |
|---|---|---|---|
| 1,900,573 | 3/1933 | McArthur | 219/10.81 X |
| 2,179,261 | 11/1939 | Keller | 219/10.81 X |
| 2,293,851 | 8/1942 | Rogers | 219/10.77 X |
| 2,506,814 | 5/1950 | Sayre | 219/10.77 X |
| 2,548,246 | 4/1951 | Walstrom | 219/10.77 |
| 2,707,742 | 5/1955 | Juhola | 219/10.77 X |
| 2,896,055 | 7/1959 | Kohler | 219/10.77 |
| 3,188,443 | 6/1965 | Hickok | 219/10.77 |
| 3,359,399 | 12/1967 | Hickok et al. | 219/10.69 |
| 3,541,289 | 11/1970 | Smith | 219/10.69 |
| 3,830,893 | 8/1974 | Steingiser | 264/25 |
| 4,205,210 | 5/1980 | Salway-Waller et al. | 219/10.81 |
| 4,342,895 | 8/1982 | Krishnakumar et al. | 264/26 X |

*Primary Examiner*—Volodymyr Y. Mayewsky
*Assistant Examiner*—Philip H. Leung
*Attorney, Agent, or Firm*—John W. Gregg

[57] ABSTRACT

Apparatus for controlled dielectric heating a plurality of thermoplastic preforms for blow molding is provided. The apparatus controls the energization of a plurality of electrode pairs by a radio frequency generator. The generator is equipped with a load current limit detector and the electrode energization is enabled selectively for a predetermined time or until a predetermined load current magnitude is reached. The choice of control is determined by the anticipated load as reflected by the number of preforms within the heating station. The generator is further provided with overload detecting means indicative of the occurrence of electrical arcing within the heating station and the apparatus has further means responsive to the arc detector for selectively momentarily or indefinitely deenergizing the electrodes.

11 Claims, 6 Drawing Figures

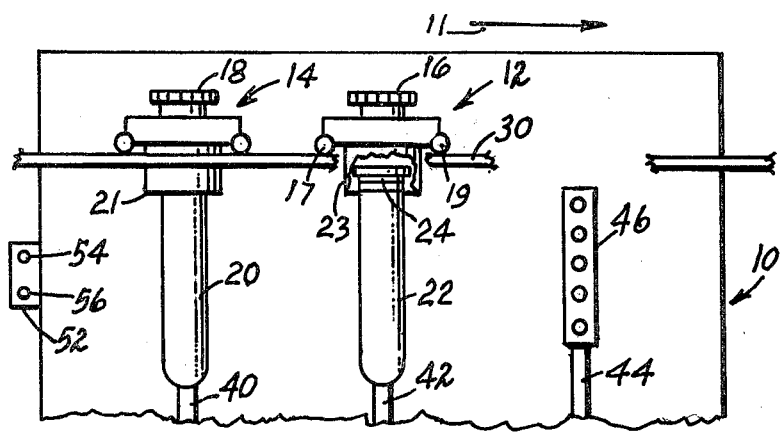
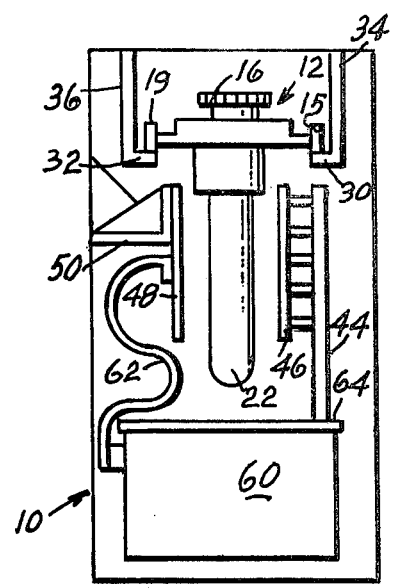
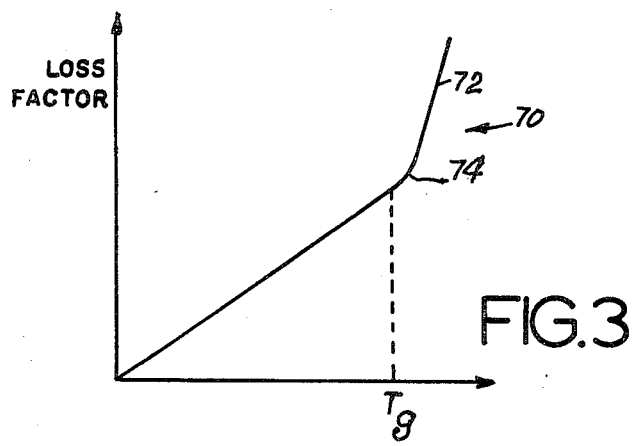
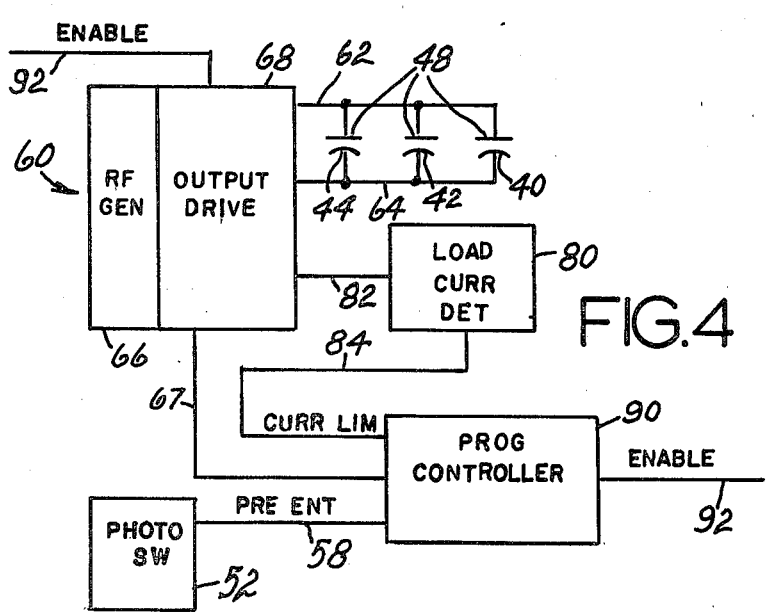

CONTROL FOR DIELECTRIC HEATING IN BLOW MOLDING MACHINE

BACKGROUND OF THE INVENTION

This invention relates generally to equipment for production of articles from thermoplastic article preforms. In particular, this invention relates to apparatus for heating thermoplastic preforms in molding equipment known as the reheat and blow type.

In reheat and blow type equipment, article preforms are loaded into a conveyor, transferred through an oven wherein the preform temperature is raised to the molecular orientation temperature, advanced to a blow molding station, and biaxially expanded into finished articles within mold cavities at the blow molding station by injection of an expansion fluid. The finished articles are then ejected for collection.

Because the thermoplastic material used is a poor conductor of heat, preform heating constitutes the most time consuming operation of the overall production process. Both convection and radiant heating suffer the same limiting factor, that is, the elevation of material temperature at the preform surface above the temperature within the preform wall. Excessive heating at the surface can result in material crystallization which, when extreme, prevents normal expansion and, in all cases, degrades desired characteristics of the finished article. Furthermore, both convection and radiant heating result in expenditures of considerably larger quantities of energy than that necessary only to raise the temperatures of the preform material to the desired level. Applicants have devised an apparatus for dielectric heating which overcomes the foresaid disadvantages of convection and radiant heating regarding product quality and energy inefficiencies. Dielectric heating effects material self-heating by inducing motion of inherently polarized molecules within the material by subjecting the material to an alternating electric field. Since these alternating fields are generally operated in the radio frequency (r-f) range, suitable control of a radio frequency generator for use in production blow molding machinery is required and has hitherto been unknown.

It is therefore one object of this invention to provide an apparatus for controlled dielectric heating of thermoplastic article preforms in article molding equipment of the reheat and blow type.

It is a further object of this invention to provide an apparatus for selective time or current controlled dielectric heating of thermoplastic preforms in article molding equipment of the reheat and blow type.

It is a still further object of this invention to provide a controlled dielectric heating apparatus responsive to the anticipated electrical load for selective time or current controlled dielectric heating of thermoplastic preforms in article molding equipment of the reheat and blow type.

Further objects and advantages of the present invention shall become apparent from the following description.

SUMMARY OF THE INVENTION

In accordance with the aforesaid objects, a control system is provied for a dielectric heating station of an article molding machine of the reheat and blow type. The heating station is provided with a plurality of electrode pairs defining heating positions within the station. The electrode pairs are energized by a radio frequency generator having a load current sensor and input circuit responsive to a control signal for selectively energizing and deenergizing the electrodes. The control comprises means for detecting the presence of preforms within the oven and means responsive to the detecting means for selectively energizing the electrode pairs for a predetermined interval or until a predetermined load current magnitude is detected.

In the preferred embodiment, the radio frequency generator includes means for detecting the occurrence of arcing in the heating station and the control further comprises means responsive to the arc detecting means for selectively momentarily deenergizing the electrode pairs or disabling the repetition of the machine cycle of operation.

BRIEF DESCRIPTION OF THE DRAWINGS

FIG. 1 is a side view of a dielectric heating station of a blow molding machine showing preforms positioned before post electrodes.

FIG. 2 is an end view of the dielectric heating station of FIG. 1 and showing the alignment of the preforms between a plate electrode and post electrode.

FIG. 3 is a graph showing the relationship of loss factor and temperature of dielectric materials.

FIG. 4 is a block diagram of the radio frequency generator control system.

DESCRIPTION OF THE PREFERRED EMBODIMENT

Figure 5A:
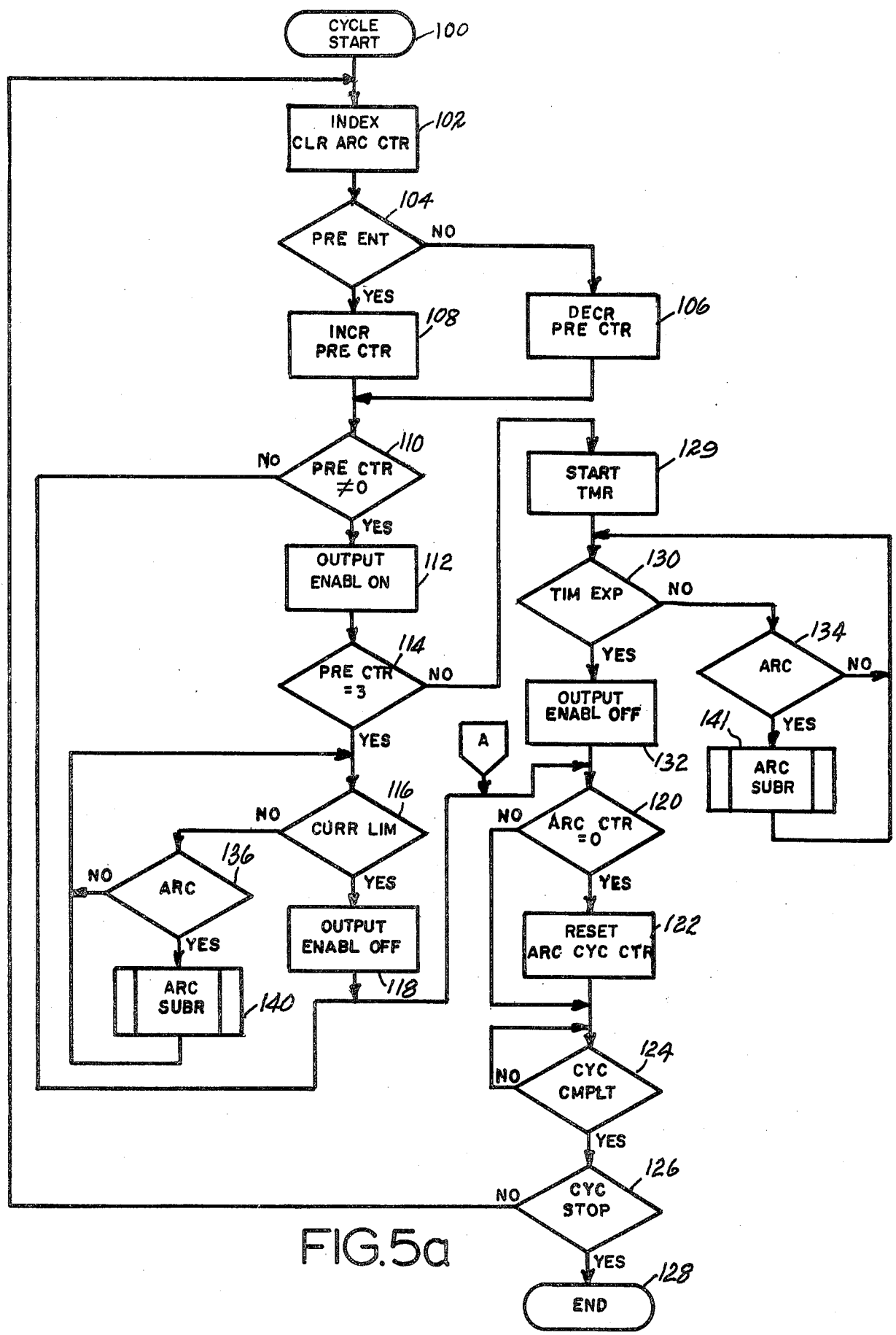
FIGS. 5a and 5b are flow charts showing the hearing station control scheme incorporated into the machine cycle of operation.

For purposes of illustrating the invention, a control apparatus used to control the r-f generator of a dielectric heating station in a reheat and blow type molding machine shall be described in some detail. The preferred embodiment to be described corresponds to equipment manufactured by Cincinnati Milacron Inc. the assignee of the present invention.

In the overall production process, preforms are loaded into carriers such as carriers 12 and 14 of FIG. 1 at a machine load station from which the carriers are then incrementally advanced through a dielectric heating station and to a blow molding station. The direction of motion through the heating station is indicated by arrow 11 of FIG. 1. At the blow molding station (not shown) the heated preforms are biaxially expanded into finished articles while retained within mold cavities. In the general case, an article manufactured on the subject equipment is provided with a formed portion for receiving an article closure device. During the expansion of the article body, it is desired that the formed portion not be in any way substantially deformed. Consequently, during conveyance of the preforms through the heating station, means are provided to shield the formed portions from the heating station heat sources.

Referring to FIG. 1, the interior of the heating station or oven is seen in a side view. Spaced along the length of the oven are three posts 40 through 44 defining the positions within the heating station at which the preform dielectric heating is to take place. Two preform carriers 12 and 14, which are supported upon rails 30 and 32 seen in the end view of FIG. 2, are shown at positions corresponding to posts 40 and 42 for the dielectric heating of the preforms 20 and 22 carried thereby. During the traverse through the heating station, the preforms are rotated by means of engagement of a rotation imparting chain with the rotation sprockets 16 and 18 for rotatably driving the preform grasping chucks 21 and 23. In the breakaway of chuck 23, formed portion 24 of preform 22 is seen in a side view shielded by the cupping section of chuck 23 from fields at the upper end of electrode strap 46 and electrode plate 48. The entry of preforms to heating station 10 is detected by a photo-detector 52 seen in FIG. 1 which comprises a light source 56 and a light sensitive sensor 54. A reflector (not shown) is placed opposite the photo-detector on the other side of the path of conveyance of preforms. As a preform passes before photo-detector 52 the reflected light from source 56 is interrupted and its presence is thus detected by sensor 54. The photo-detector thereby produces an output signal indicating that a preform has entered the heating station 10. It is to be understood that other sensors could be used, such as, for example, a conventional limit switch or a sonic sensor.

Referring now to FIG. 2, we see preform 22 suspended within carrier 12 which is supported on rails 30 and 32. The preform 22 is seen between post 44 and the electrode 48 which consists of a flat plate extending along the part of the length of heating station 10 corresponding to the length defined by the innermost and outermost post electrodes 40 and 44. Affixed to the electrode post 44 is seen the electrode strap 46. Support means 50 for electrode plate 48 permit adjustment of the position of this electrode toward and away from the longitudinal centerline of the heating station. Likewise posts 40 through 44 are positionable toward and away from the station centerline. Electrode strap 46 and corresponding straps are not shown on posts 40 and 42 may be contoured to most effectively transfer the energy to the inner wall sections of preforms resident within the heating station. In FIG. 2, the RF generator 60 is seen disposed below the lane defined by the electrode pairs comprising electrode plate 48 and the electrode posts 40 through 44 with their associated straps. While connection between posts 40 through 44 on the generator 60 is provided through common plate 64 mechanically attached to generator 60 the drive for electrode plate 48 is provided through loading conductor 62.

While dielectric heating in general has been known for some time, applicants control scheme presents particular advantages in high production equipment in that it is selectively responsive to the total electrical load seen by r-f generator 60 within heating station 10. It will be appreciated by those skilled in the art that the load seen by generator 60 is dependent on the dielectric disposed between electrode pairs defined by electrode plate 48 and posts 40 through 44. Thus, in the event the station is not fully loaded as, for example, illustrated by the presence of two preforms in FIG. 1, the anticipated load for generator 60 is less than when the heating station is fully loaded, i.e., when three preforms are present. As is known, the maximum load current desired for the fully loaded heating station is related to the loss factor of the material being heated.

Referring now to FIG. 3, graph 70 shows a relationship between the dielectric material loss factor and the material temperature by curve 72. The relationship indicated by curve 72 is generally true for dielectric materials and applicants' control is designed to make use of the information presented by this curve. That is, as the temperature of the material rises from the self-heating effects of dielectric heating, the loss factor follows a gradual increase to a point at which the loss factor changes dramatically with relatively little increase in temperature. The knee 74 of curve 72 occurs at different temperatures for different materials and may correspond generally to a phase change of the material. Of particular interest in thermoplastic blow molding is the material temperature known as the glass transition temperature (Tg). As shown on the curve, this temperature appears just below the knee. Blow molding is most advantageously accomplished when the material temperature is in a range above the glass transition temperature and below the crystallization temperature known as the molecular orientation range. This range corresponds roughly to temperature on the knee of curve 72. At any rate, the increased dielectric loss factor poses a substantially increased load to the output circuit of the r-f generator. Therefore, by monitoring the current at the output stage of the r-f generator, it is possible to determine the point at which the rate of change of material temperature peaks and the heating effects are resulting in a phase change of the material being heated. It is therefore possible to predetermine desirable load current for the heating station r-f generator corresponding to the current at which the heating desired has taken place and current increases thereafter represent an undesirable change of the material disposed within the heating station.

Referring now to FIG. 4, the block diagram shows the cooperation of the devices heretofore described together with a programmable controller used by applicants to control the overall machine cycle of operation. The r-f generator 60 includes a generator section 66 for producing the radio frequency signal and an output drive stage 68 responsive to an input enable signal 92 for selectively energizing and deenergizing the electrodes. A load current detector 80 is connected to the output drive stage 68 and monitors a drive current on line 82 which is proportional to or directly within the path of the load presented by the electrode pairs defined by posts 40 through 44 and electrode plate 48. As shown in FIG. 4, the electrodes 40 through 44 and plate 48 constitute the plates of three capacitors, the dielectric of which and hence, the effective capacitance of which depend on the electrode spacing and the presence or absence of a preform therebetween.

Continuing with reference to FIG. 4, the load current detector 80 is provided with a presettable limit detector to produce an output signal on line 84 corresponding to a load current magnitude having reached a predetermined limit. The photodetector 52 produces the output signal on line 58 indicating that a preform has entered the heating station. One further input to programmable controller 90 is an output from the output drive 68 of r-f generator 60 which indicates that an arc has occurred within heating station 10. This output may correspond to an overload detector associated with output drive 68. Programmable controller 90 is of a type commercially available and manufactured by the assignee of the present invention. The controller includes input and output interface circuits and a logic processor for executing a stored program relating input signal states to output signal states. The output produced by programmable controller 90 is an enable signal 92 used as an input to output drive 68 for selectively energizing and deenergizing the load. Any programmable controller which has the ability to monitor input signals, perform limited counting and timing functions and combinational logic operations, and produce output signals suitable for interfacing to the r-f generator output drive stage 68 through its enable input 92 could be used. It is to be understood further, that provided an alternative control performs functions substantialy in conformance with those to be described hereinafter, other types of control circuitry may be used. Particularly, the control may be implemented using conventional control relays interfaced to the r-f generator, load current detector and photo switch or other sensor through the appropriate buffer relays. Counting can be accomplished by selectively latching control relays in response to the occurence of an event to be counted and timing may be accomplished using commercially available timers or timed relays.

Figure 5B:
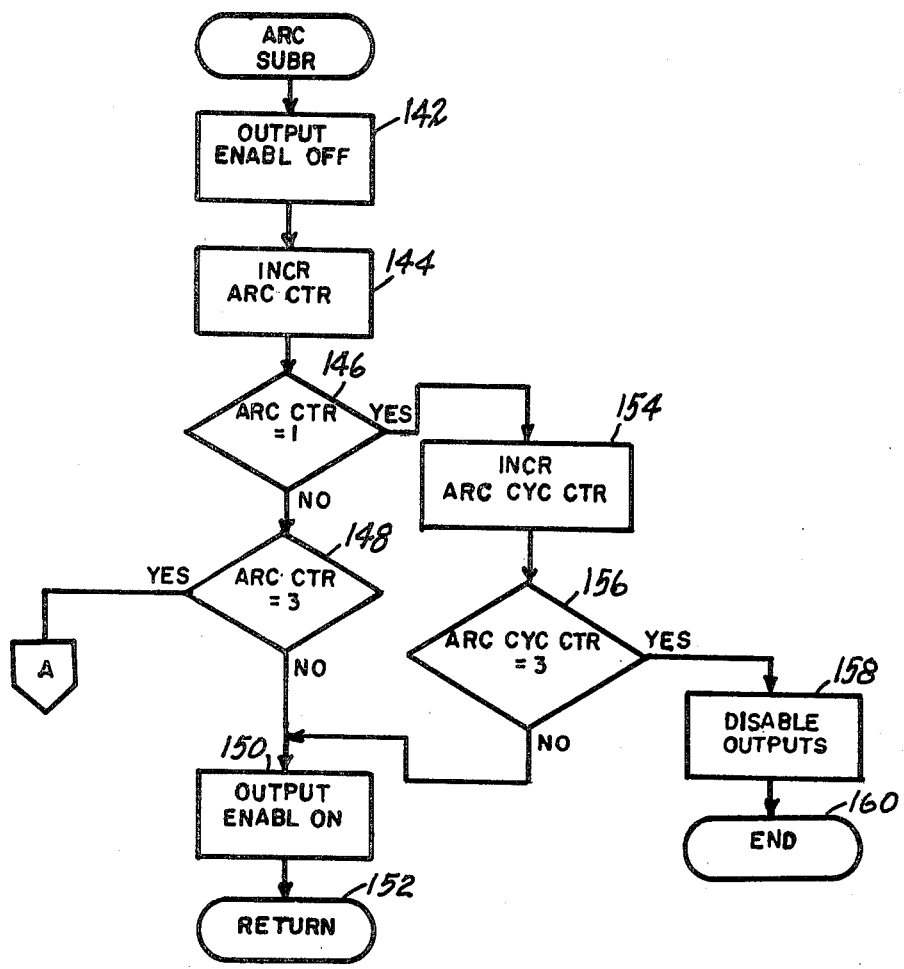

Referring now to FIGS. 5a and 5b, the machine cycle of operation together with the particular control scheme to be used in controlling the dielectric heating of the heating station 10 shall be described. Referring to FIG.5a, the machine cycle of operation is initiated by the operator activating a cycle start signal indicated in terminal 100. The first step of the machine cycle of operation is to effect an index of the machine's conveyor which advances the carriers as shown in FIG. 1 into position at each of the machine operating stations. The activity of each machine operating station is then initiated and when the activity of each operating station has been completed, signals indicating the same are combined to produce a cycle complete signal which is tested for at decision step 124. Assuming that the operator has not requested that the cycle stop as determined by decision step 126, the machine cycle is automatically repeated by requesting another index as seen by the arrow returning to the top of the flow chart above process step 102. And thus, another index is effected and the functions of the various operating stations are again initiated.

The cycle of operation of the heating station 10 begins with the determination of whether or not the electrode pairs are to be energized, which is in turn dependent on whether or not there are any preforms resident within the heating station. Decision step 104 determines whether the photodetector 52 has indicated that a preform has entered the heating station. If not, a preform counter must be decremented as indicated by process step 106. But on the other hand, if a preform has entered the heating station 10 then the preform counter is incremented as indicated by process step 108. In the case of the oven shown, the preform counter need count up to the maximum number 3 and increment signals produced after the maximum has been reached, serve only to effect an overflow from the preform counter while maintaining its count at the maximum. Likewise, decrement signals occurring after the counter contents equal zero leave the contents equal to zero. Following the increment or decrement step, the contents of the preform counter are tested to determine whether or not there is resident within heating station 10 at least one preform, that is, the contents are tested for a nonzero value as indicated by the decision block of process step 110. In the event the preform counter content equals zero, no heating is to take place for the current machine cycle index and process steps 112 through 118 are skipped as indicated by the arrow on the "no" side of decision step 110. The process then is in a "wait" condition pending completion of the operating station functions. In contrast, if the preform counter is not equal to zero, then the process continues on the "yes" line to process step 112 which outputs the enable signal in an "on" condition. This results in energization of the electrode pairs within heating station 10.

As previously described, the electrode energization for a full complement of preforms within heating station 10 is controllable in response to the detection of a predetermined current limit. However, when less than a full complement of preforms is resident within heating station 10, applicants have chosen to control the energization of the electrode pairs for a predetermined interval. Thus, decision step 114 determines whether or not the preform counter magnitude is equal to three. If less than three preforms are resident within the heating station, the process continues on the "no" side of decision step 114 to process step 129 where the interval timer is started. Provided the preform counter magnitude is equal to three, the process continues on the "yes" side of decision step 114 to decision step 116 wherein it is determined whether or not the predetermined current limit has been met. When load current detector 80 of FIG. 4 produces the output signal "current limit" on line 84, the programmable controller will then put the "enable" output on line 92 to the condition to deenergize the electrode pairs of heating station 10. This is indicated by process step 118 where the output enable is set "off". Until the current limit is detected, the process is held in a loop from process decision step 116 proceeding through the decision step 136 determining whether or not an electrical arc has occurred within heating station 10 and responding thereto as indicated by block 140 or if not, continuing to await the generation of the current limit signal on line 84. Once the enable signal on line 92 has been set "off" by process step 118 the machine cycle of operation continues at process decision step 120 and therefrom ultimately to decision step 124 where the determination of whether or not the other operating station functions have been completed.

In a similar manner to the functional loop of the current limit decision block 116, the timed operation of electrode energization goes through a function loop through decision step 130. In this block, the timer energized by process step 129 is interrogated to determine whether or not the predetermined time interval has expired. If not, the process continues in the functional loop through decision step 132 which determines whether or not an arc has occurred and responds thereto by either executing the arc service subroutine as indicated by block 141 or returning to the time expire decision step 130 directly. Once the time has expired, the process continues through process step 132 whereby the programmable controller 90 puts the "enable" signal on line 92 in the condition required to deenergize the electrodes and thereafter, the overall machine cycle of operation is continued through the decision steps 120 through 126.

As has been previously stated, applicants preferred embodiment includes control sequences for responding the undesirable arcing within the heating station. The arc service subroutine procedure is shown in FIG. 5b. When decision steps 134 or 136 detect the occurrence of an arc within the heating station 10 the arc service subroutine of FIG. 5b is executed. Whenever arcing is detected, the programmable controller 90 sets the "enable" signal on line 92 to its "off" condition as indicated by process step 142. In response to having detected the occurrence of an arc, an arc counter is incremented as indicated by process step 144. A determination is made whether or not the arc counter, which has been previously reset on the initiation of the last index as indicated in process step 102, is currently indicating the occurrence of the first arc of the present machine cycle. This determination is made at process decision block 146 where the contents of the arc counter are tested for equality with one. If this is the first arc occurrence of the current index, then an arc cycle counter is incremented as indicated by process step 154. Thereafter, the contents of the arc cycle counter are tested and if the arc cycle counter is equal to three, indicating that there have been arcs on the last three successive machine cycles, then the process continues at process step 158 wherein the programmable controller disables its outputs, effectively inhibiting execution of a machine cycle of operation and the machine cycle is terminated as indicated by the termination block process step 160. Provided that the arc cycle counter is not equal to three, the process will then continue at process step 150 where the output "enable" is set to its "on" condition to allow the r-f generator to once again energize the electrodes. Following this activity, the process continues through the return indicated by process step 152 to the main control sequence where the process resumes at decision steps 116 or 130 of FIG. 5a.

Continuing with reference to FIG. 5b, in the event that the current arc occurrence is not the first arc occurrence of the present machine cycle index, the arc counter will equal a number greater than one so that decision step 146 will determine that the arc counter is not equal to one and the process will continue at decision step 148. If the arc counter is equal to three, indicating that there have been three occurrences of arcing during the current machine index cycle then the process is terminated with the electrodes left in their deenergized condition through the flag A bringing control back to the procedure of FIG. 5a at decision step 120. As long as fewer than three occurrence of arcing are indicated by decision step 148 of FIG. 5b, the process is permitted to continue with reenergization of the electrodes as indicated by process step 150.

Continuing with reference to the mainline process flow chart of FIG. 5a, the final two steps of the dielectric heating process are represented by decision step 120 and process step 122. Decision step 120 tests the contents of the arc counter to determine whether any electrical arcs have occurred during the current machine cycle. If none have occurred, the arc contents shall equal zero and the process continues to step 122 effecting reset of the arc cycle counter. The function of the arc cycle counter is to give an indication of a long term rate of repetition of arc occurrence that indicate a process malfunction. Applicants have chosen to test for the occurrence of three successive machine cycles in which arcing occurs. However, if a dielectric heating cycle is completed without the occurrence of arcing then the arc cycle counter is reset. If at the completion of the dielectric heating cycle, the arc counter contents are nonzero, the arc cycle counter is not reset as indicated by the arrow from the "no" side of decision step 120 bypassing process step 122. In either event, the overall process proceeds to decision step 124 and then to decision step 126 as heretofore described.

It will now be appreciated by those skilled in the art that it is anticipated that there may be some occurrence of arcing within the heating station 10, and that in all cases applicants choose to deenergize the electrodes to inhibit the continuation of the arcing and then, based upon the relative rate of repetition of the arcing, either discontinue the operation of the machine cycle, or inhibit further heating during the present index cucle, or allow the heating to continue for the present index cycle. It is applicants' belief that a relatively high degree of repeated arcing will occur only when the electrodes of the heating station 10 are improperly adjusted or the article preform material is defective in some respect.

It is to be understood that while the invention has been described in considerable detail with reference to the preferred embodiment, that it is not the intention of the applicants to thus limit the invention to such detail. Particularly, the number of heating positions within the heating station and the particular arrangement of electrodes within the station are details not affecting applicants control scheme for delectric heating of the article preforms. It is intended to cover all modifications, alterations, and equivalents falling within the spirit and scope of the appended claims.

What is claimed is:

1. In an apparatus for dielectric heating a plurality of thermoplastic article preforms having heating station, said heating station having a plurality of pairs of electrodes energizable by a radio frequency generator, the generator being provided with a load current sensor producing a current limit signal at a selectable load current magnitude and an input circuit for selectively energizing and deenergizing the electrodes in response to a control signal, the preforms to be heated being placed between the electrodes of the pairs, an improved control apparatus comprising:
    (a) means responsive to the number of preforms resident in the heating station for selecting interval control and current control, current control being selected when the number of resident preforms equals the number of pairs of electrodes;
    (b) timing means responsive to the selecting means for producing an interval control signal for application to the input circuit to effect energization of the electrode pairs for a predetermined period of time in response to interval control being selected; and
    (c) current control means responsive to the selecting means and the current limit signal for producing a current control signal for application to the input circuit to effect energization of the electrode pairs until a predetermined load current magnitude is reached in response to current control being selected.

2. The apparatus of claim 1 wherein the generator further includes an overload sensor for producing an arc detected signal representing the occurrence of electrical arcing within the heating station during energization of the electrodes, and the apparatus further comprises:
    (a) means responsive to the arc detected signal for immediately setting the control signal to a condition to effect deenergization of the electrode pairs; and
    (b) means responsive to the deenergization of the electrode pairs for selectively setting the control signal to its electrode energization condition and indefinitely inhibiting setting the control signal to its electrode energization condition.

3. In an apparatus dielectric heating a plurality of thermoplastic article preforms having a heating station, said heating station having a plurality of pairs of electrodes energizable by a radio frequency generator, the generator being provided with a load current sensor producing a current limit signal at a selectable load current magnitude and an input circuit for selectively energizing and deenergizing the electrodes in response to a control signal, the preforms to be heated being placed between the electrodes of the pairs, an improved control apparatus comprising:

(a) means for producing a preform resident signal representing the number of preforms resident within the heating station;

(b) timing means responsive to the preform resident signal for producing an interval control signal for application to the input circuit to effect energization of the electrodes for a predetermined period of time when the number of preforms within the heating station is at least one and less than the number of pairs of electrodes; and (c) current control means responsive to the preform resident signal and the current limit signal for producing a current control signal for application to the input circuit to effect energization of the electrodes until a predetermined load current magnitude is reached in response to the present signal representing a number of preforms within the heating station equal to the number of pairs of electrodes.

4. The apparatus of claim 3 wherein the generator further includes an overload sensor for producing an arc detected signal representing the occurrence of electrical arcing within the heating station during energization of the electrodes, and the apparatus further comprises:

(a) means responsive to the arc detected signal for immediately setting the control signal to a condition to effect deenergization of the electrode pairs; and (b) means responsive to the deenergization of the electrode pairs for selectively setting the control signal to its electrode energization condition and indefinitely inhibiting setting the control signal to its electrode energization condition.

5. In an apparatus for dielectric heating a plurality of thermoplastic article preforms having a heating station, said heating station having a plurality of pairs of electrodes energizable by a radio frequency generator, the generator being provided with a load current sensor producing a current limit signal at a selectable load current magnitude and an input circuit for selectively energizing and deenergizing the electrodes in response to a control signal, an improved control apparatus comprising:

(a) detecting means for producing a signal indicating passage of a preform into the heating station;

(b) counting means responsive to the detecting signal for producing a preform count signal representing the number of preforms within the heating station;

(c) timing means responsive to the counting means for producing an interval control signal for application to the input circuit to effect energization of the electrodes for a predetermined period of time when the number of preforms within the heating station as represented by the count signal is at least one and less than the number of pairs of electrodes; and (d) current control means responsive to the counting means and the current sensor for producing a current control signal for application to the input circuit for effecting energization of the electrodes until a predetermined current magnitude is detected in response to the count signal representing a number of preforms resident within the heating station equal to the number of pairs of electrodes.

6. The apparatus of claim 5 wherein the generator includes and overload sensor for producing an arc detected signal indicative of the occurrence of electrical arcing within the heating station during energization of the electrodes, and the apparatus further comprises:

(a) means responsive to the arc detected signal for immediately setting the control signal to a condition to effect deenergization of the electrode pairs; and (b) means responsive to the deenergization of the electrode pairs for selectively setting the control signal to its electrode energization condition and indefinitely inhibiting setting the control signal to its electrode energization condition.

7. The apparatus of claim 6 further comprising:

(a) arc occurrence counting means responsive to the arc detected signal for counting the number of occurrences of arcing; and (b) means responsive to the arc counting means for inhibiting energization of the electrodes for an indefinite period when the counting means has recorded a predetermined number of occurrences of arcing.

8. The apparatus of claim 7 comprising:

(a) means for producing an advance signal for effecting passage of preforms into and out of the the heating station; and (b) means responsive to the advance signal for resetting the arc counting means.

9. The apparatus of claim 5 further comprising means for producing an advance signal for effecting passage of preforms into and out of the heating station.

10. The apparatus of claim 9 further comprising:

(a) means responsive to the advance signal and the detecting signal for incrementing the preform counting means when a preform is detected passing into the heating station after an advance signal; and (b) means responsive to the advance signal and the detecting signal for decrementing the counting means when no preform passes into the heating station following the advance signal.

11. The apparatus of claim 5 wherein the generator includes an overload sensor for producing an arc detected signal indicative of the occurrence of electrical arcing within the heating station during energization of the electrodes, and the apparatus further comprises means responsive to the arc detected signal for momentarily changing the control signal to effect a momentary deenergization of the electrodes.

* * * * *